UNITED STATES PATENT OFFICE 2,651,638

DERIVATIVES OF 1,2,3-TRISUBSTITUTED PYRAZOLONES AND PROCESSES OF PRODUCING SUCH COMPOSITIONS

Jules H. T. Ledrut, Brussels, Belgium, assignor to Luxema S. A., Ixelles (Brussels), Belgium, a company of Luxemburg No Drawing. Application December 19, 1950, Serial No. 201,706. In the Netherlands December 21, 1949

7 Claims. (Cl. 260—310)

This invention relates to derivatives of 1,2,3-trisubstituted pyrazolones and processes of producing such compositions.

An object of this invention is to produce aldehydes of 1,2,3-trisubstituted pyrazolones efficiently and in good yields.

Another object of this invention is to provide new derivatives of 1,2,3-trisubstituted pyrazolones from which aldehydes of 1,2,3-trisubstituted pyrazolones can be readily produced.

The aldehydes of 1,2,3-trisubstituted pyrazolones have remarkable antithermic characteristics. In addition, they are utilized as reactants in the production of barbituric acid and thiobarbituric acid derivatives of 1,2,3-trisubstituted pyrazolones which, in addition to possessing marked hypnotic properties, have a substantially greater antithermic effect for the same dosage than the widely used antipyrine (1-phenyl-2,3-dimethyl-5-pyrazolone). The production of such barbituric acid or thiobarbituric acid derivatives are described in another patent application of applicant.

In accordance with this invention, the aldehydes of 1,2,3-trisubstituted pyrazolones are produced by efficient processes in good yields. These processes involve reacting an arylsulfone hydrazide of the carboxylic acid of a 1,2,3-trisubstituted pyrazolone having the formula:

(1)

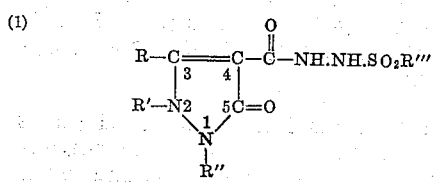

with an alkaline carbonate or bicarbonate. When an alkali metal carbonate is used, the reaction proceeds as follows:

(2)

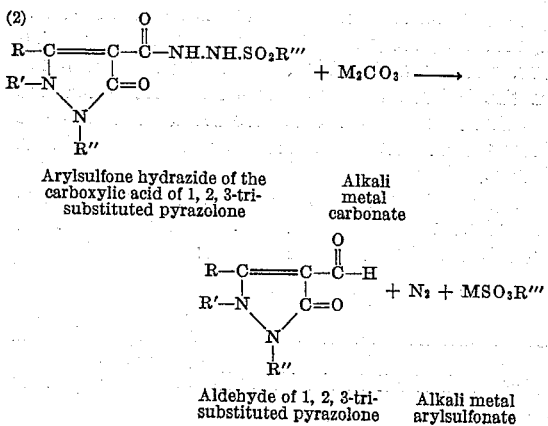

in which R, R' and R'' represent alkyl or aryl radicals, R''' represents an aryl radical and M an alkali metal. Examples of the alkyl radical are methyl, ethyl, propyl, etc.; those of the aryl radical are phenyl, naphthyl, etc.; and those of the alkali metal are sodium and potassium.

The aldehyde of a 1,2,3-trisubstituted pyrazolone may be produced by the decomposition of the arylsulfone hydrazide of the carboxylic acid of a 1,2,3-trisubstituted pyrazolone by means of an alkaline carbonate or bicarbonate in any suitable medium. Desirably, however, the reaction is conducted in the presence of an organic solvent, such as an alcohol. A polyhydric alcohol, such as glycerol, has been found satisfactory for this purpose. For example, the arylsulfone hydrazide of the carboxylic acid of a 1,2,3-trisubstituted pyrazolone is dissolved in glycerol and the solution is heated to about 160° C. To the heated solution is added an alkaline carbonate or bicarbonate in an amount in excess of that theoretically required to effect the decomposition of the hydrazide, such as about five times the theoretical amount of carbonate or bicarbonate. After a few minutes, the aldehyde of the 1,2,3-trisubstituted pyrazolone may be separated from the reaction mixture by any convenient means, such as by extraction with a suitable organic solvent, such as chloroform, and recovery in the form of a residue after evaporation in vacuum of the solvent. Further purification of the aldehyde may be effected by recrystallization from an organic solvent, such as a mixture of dioxane and ethyl acetate.

The hydrazides of the carboxylic acids of 1,2,3-trisubstituted pyrazolones are new compounds and may be prepared by either of two processes. In both processes, the acid chloride of the carboxylic acid of a 1,2,3-trisubstituted pyrazolone is employed as the starting material. The acid chloride may be prepared by the action of thionyl chloride upon the carboxylic acid of the 1,2,3-trisubstituted pyrazolone. In one process, the acid chloride of the carboxylic acid of the 1,2,3-trisubstituted pyrazolone is reacted with an arylsulfone hydrazide. The arylsulfone hydrazide is dissolved in a suitable solvent, such as pyridine, and the resulting solution is desirably cooled by means of ice. To the cooled solution, there is added in small amounts and while stirring the acid chloride of the carboxylic acid of the 1,2,3-trisubstituted pyrazolone. The reaction mixture is permitted to stand for a period of about two hours, after which water is added and the precipitate obtained is separated, dried, washed with water and ethyl alcohol and finally with ethyl ether to remove the pyridine or other solvent employed in the reaction mixture. The precipitate, which is the arylsulfone hydrazide of the carboxylic acid of the 1,2,3-trisubstituted pyrazolone, may be dried in air and, if desired, further purified by recrystallization in a suitable solvent, such as ethyl alcohol. The reaction between the acid chloride and the arylsulfone hydrazide proceeds as follows:

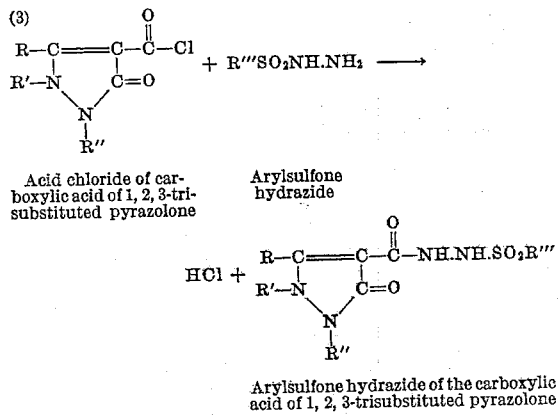

In Equation 3 and throughout this description, R, R', R'' and R''' have the same meaning as heretofore defined.

In the second method, an acid chloride of the carboxylic acid of the 1,2,3-trisubstituted pyrazolone is reacted with hydrazine to produce the hydrazide of the carboxylic acid of the 1,2,3-trisubstituted pyrazolone and that resulting compound is in turn reacted with an arylsulfonyl chloride to produce an arylsulfone hydrazide of the carboxylic acid of the 1,2,3-trisubstituted pyrazolone. The acid chloride may be added slowly to a cooled aqueous solution of the hydrate of hydrazine, and the reaction mixture may be permitted to stand at room temperature for a period of about one hour. Desirably the amount of hydrazine in the reaction mixture is in excess of that required to react with the acid chloride. The precipitate formed, which is the hydrazide of the carboxylic acid of the 1,2,3-trisubstituted pyrazolone, may be separated by any convenient means, such as filtration. It may be purified by washing with water, drying and recrystallizing in a suitable solvent, such as ethyl alcohol. The reaction between the acid chloride and hydrazine proceeds as follows:

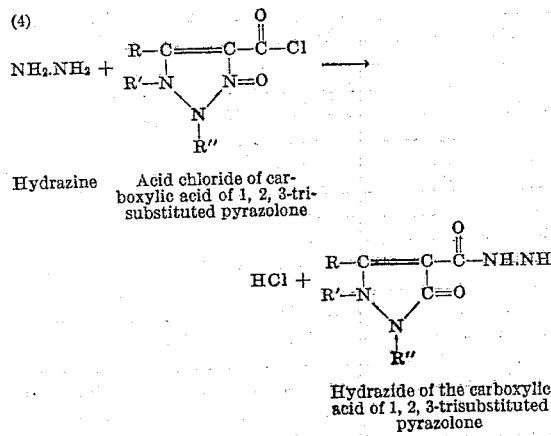

The hydrazide of the carboxylic acid of the 1,2,3-trisubstituted pyrazolone is converted to an arylsulfone hydrazide of the carboxylic acid of the 1,2,3-trisubstituted pyrazolone by reaction with an arylsulfonyl chloride. The hydrazide of the carboxylic acid of the 1,2,3-trisubstituted pyrazolone is dissolved in an organic solvent, such as a tertiary amine. Anhydrous pyridine is particularly satisfactory for this purpose. Desirably the resulting solution is cooled, and to the cooled solution is added an arylsulfonyl chloride. The reaction mixture is permitted to stand at room temperature for about two hours, and water is added. The precipitate obtained, which is the arylsulfone hydrazide of the carboxylic acid of the 1,2,3-trisubstituted pyrazolone, is air dried and washed successively with 0.01N hydrochloric acid and with water. Further purification can be effected, if desired, by recrystallization in a suitable solvent, such as ethyl alcohol. The reaction between the hydrazide of the carboxylic acid of the 1,2,3-trisubstituted pyrazolone and the arylsulfonyl chloride proceeds as follows:

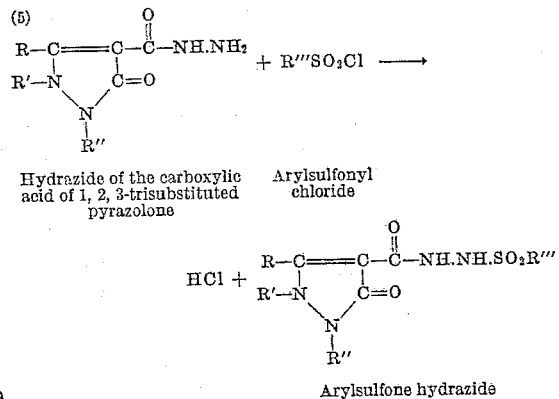

A more comprehensive understanding of this invention is obtained by reference to the following examples:

EXAMPLE 1

*Preparation of the hydrazide of 1-phenyl-2,3-dimethyl-4-carboxy-5-pyrazolone from the acid chloride of 1-phenyl-2,3-dimethyl-4-carboxy-5-pyrazolone*

In small amounts and in cold state, 2.5 grams of the acid chloride of 1-phenyl-2,3-dimethyl-4-carboxy-5-pyrazolone, prepared according to the method of Kaufmann and Huang (Ber. dtsch., chem. Ges. 1942—75, p. 1220), is dissolved in 1.5 grams of the hydrate of hydrazine in aqueous 70% solution. After standing for one hour, the hydrazide precipitate formed is filtered, pressed out, washed with water, dried and recrystallized in the boiling absolute alcohol. The hydrazide obtained with a quantitative yield possesses the formula of structure $C_{12}H_{19}O_5N_3$ and melts at 270° C.

The quantitative analysis of the hydrazide obtained gives the following percentages, compared with the theoretical percentages:

|  | C | H | O |
|---|---|---|---|
| Calculated | 58.54 | 5.69 | 13.16 |
| Found | 58.40 | 5.23 | 14.03 |

The reaction involved in this example is represented as follows:

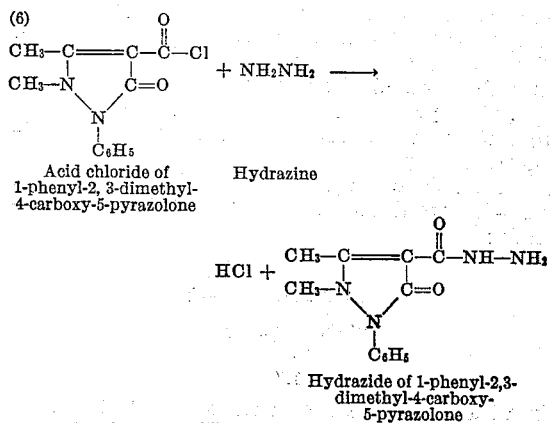

EXAMPLE 2

*Preparation of benzene sulfone hydrazine of 1-phenyl-2,3-dimethyl-4-carboxy-5-pyrazolone*

Two grams of benzene sulfone hydrazide, prepared according to the method of Curtius & Lorenzen (Jour. f. prakt. Chem. 2—58—p. 166) is dissolved in 5 cc. of pyridine. While cooling the solution by means of ice 2.5 grams of the acid chloride of 1-phenyl-2,3-dimethyl-4-carboxy-5-pyrazolone is added thereto in small portions and while stirring. The mixture takes on a greenish color, which is the more pronounced the less pure the acid chloride is.

After standing two hours water is added and the precipitate obtained is air-dried and washed abundantly with water and then with ethyl alcohol. In order to eliminate any soluble impurities and traces of pyridine that may remain in the precipitate, the latter is further washed with ether. After air drying, the precipitate is recrystallized in absolute ethyl alcohol.

The benzene sulfone hydrazide obtained, having the formula $C_{18}H_{18}O_4N_4S$, melts at 262° C. The sulfur content of this hydrazide was found on analysis to be 8.28% compared with a theoretical sulfur content of 8.29%.

The reaction involved in this example is represented as follows:

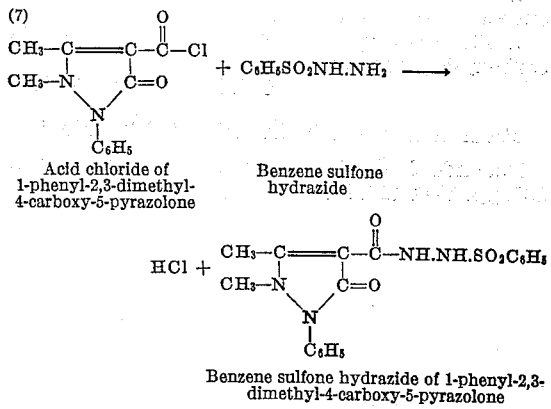

EXAMPLE 3

*Preparation of benzene sulfone hydrazide of 1-phenyl-2,3-dimethyl-4-carboxy-5-pyrazolone*

2.46 grams of hydrazide of 1-phenyl-2,3-dimethyl-4-carboxy-5-pyrazolone, obtained according to Example 1, is dissolved in 60 cc. of pure and anhydrous pyridine.

To the solution obtained there is added 1.76 gr. of benzene sulfonyl-chloride, prepared by the reaction of phosphorus pentachloride with benzene sulphonic acid.

After standing for two hours water is added, and the precipitate of benzene hydrazide sulfone obtained is recovered, air-dried, washed successively with 0.01N hydrochloric acid and with water and finally is recrystallized in absolute ethyl alcohol.

The benzene sulfone hydrazine of 1-phenyl-2,3-dimethyl-4-carboxy-5-pyrazolone obtained melts at 262° C.

The reaction involved in this example is represented as follows:

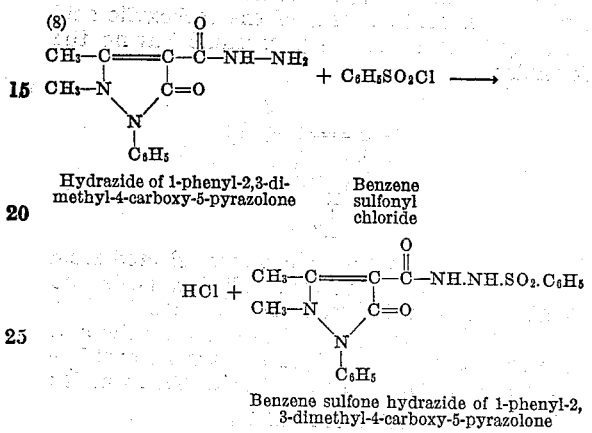

EXAMPLE 4

*Preparation of the aldehyde of 1-phenyl-2,3-dimethyl-5-pyrazolone*

1.5 grams of benzene sulfone hydrazide of 1-phenyl-2,3-dimethyl-4-carboxy-5-pyrazolone obtained according to either of the modes of operation described in Examples 2 or 3 is added to 5 cc. of glycerol. The mixture is heated in an oil bath at 160° C. (inside temperature). When all the benzene sulfone hydrazide has become dissolved in the glycerol there is added to the solution, in a single quantity, 2 grams of sodium carbonate which is pulverized and dry. The mixture obtained is then left for two minutes at 160° C., after which it is poured into the warm water. After cooling, the mixture is extracted with chloroform. The chloroform extract is washed by means of a saturated solution of sodium carbonate and then dried with anhydrous sodium sulfate. The chloroform is then driven off by heating on a steam bath in vacuum.

The residue obtained of yellow color is recrystallized in a mixture consisting of equal parts of dioxane and of ethyl acetate. The yield attained is 50%.

The aldehyde obtained melts at 160° C., whereas the semi-carbazone melts at 245–248° C.

The reaction involved in this example is represented as follows:

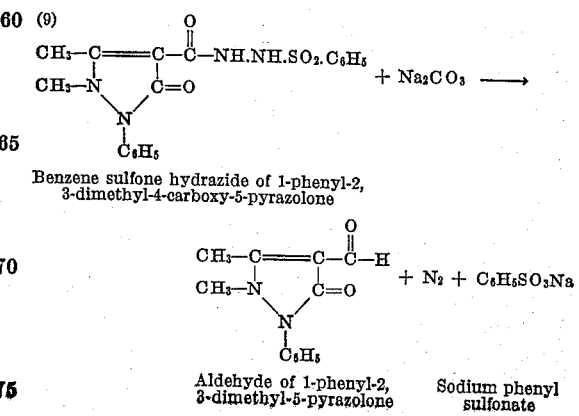

The terms and expressions which are employed herein are used as terms of description and not of limitation, and there is no intention, in the use of such terms and expressions, of excluding any equivalents of the features described or portions thereof, but it is recognized that various modifications are possible within the scope of the invention claimed.

What is claimed is:

1. The process of producing an aldehyde of a 1,2,3-trisubstituted pyrazolone which comprises reacting an acid chloride of the carboxylic acid of a 1,2,3-trisubstituted pyrazolone having the formula:

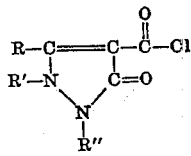

in which R represents a member selected from the class consisting of lower alkyl radicals and monocyclic aryl hydrocarbon radicals, R' is a lower alkyl radical and R'' is a monocyclic aryl hydrocarbon radical, with a monocyclic aryl hydrocarbon sulfone hydrazide having the formula:

R'''SO$_2$.NH.NH$_2$ in which R''' is a monocyclic aryl hydrocarbon radical, and reacting the resulting monocyclic aryl hydrocarbon sulfone hydrazide of the carboxylic acid of the 1,2,3-trisubstituted pyrazolone with a member selected from the class consisting of alkali metal carbonates and alkali metal bicarbonates.

2. The process in accordance with claim 2, in which the acid chloride of the carboxylic acid of a 1,2,3-trisubstituted pyrazolone is the acid chloride of 1-phenyl-2,3-dimethyl-4-carboxy-5-pyrazolone and the monocyclic aryl hydrocarbon sulfone hydrazide is benzene sulfone hydrazine.

3. The process of producing an aldehyde of a 1,2,3-trisubstituted pyrazolone which comprises reacting a monocyclic aryl hydrocarbon sulfone hydrazide of the carboxylic acid of a 1,2,3-trisubstituted pyrazolone having the formula:

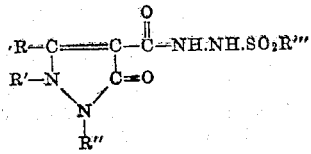

in which R represents a member selected from the class consisting of lower alkyl radicals and monocyclic aryl hydrocarbon radicals, R' is a lower alkyl radical and R'' is a monocyclic aryl hydrocarbon radical and R''' is a monocyclic aryl hydrocarbon radical, with a member selected from the class consisting of alkali metal carbonates and alkali metal bicarbonates.

4. The process of producing an arylsulfone hydrazide of the carboxylic acid of a 1,2,3-trisubstituted pyrazolone which comprises reacting an acid chloride of the carboxylic acid of 1,2,3-trisubstituted pyrazolone having the formula:

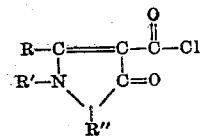

in which R represents a member selected from the class consisting of lower alkyl radicals and monocyclic aryl hydrocarbon radicals, R' is a lower alkyl radical and R'' is a monocyclic aryl hydrocarbon radical, with a monocyclic aryl hydrocarbon sulfone hydrazide having the formula:

R'''SO$_2$NH.NH$_2$ in which R''' is a monocyclic aryl hydrocarbon radical.

5. A hydrazide of the carboxylic acid of a 1,2,3-trisubstituted pyrazolone, having the formula:

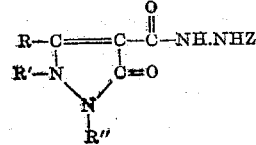

in which R represents a member selected from the class consisting of lower alkyl radicals and monocyclic aryl hydrocarbon radicals, R' is a lower alkyl radical, R'' is a monocyclic aryl hydrocarbon radical and Z represents a member selected from the class consisting of hydrogen and a monocyclic aryl hydrocarbon sulfonyl group.

6. Benzene sulfone hydrazide of 1-phenyl-2,3-dimethyl-4-carboxy-5-pyrazolone.

7. The hydrazide of 1-phenyl-2,3-dimethyl-4-carboxy-5-pyrazolone.

JULES H. T. LEDRUT.

References Cited in the file of this patent

Bodendorf et al., Annalen der Chemie, vol. 563, pp. 1–11 (1949).